United States Patent
Sugahara et al.

[11] 3,851,741
[45] Dec. 3, 1974

[54] FLUID ACTUATED CLUTCH ASSEMBLY

[75] Inventors: Eisuke Sugahara; Yusaku Yagi, both of Tokyo; Akihito Owada, Warabi, all of Japan

[73] Assignee: Nippon Piston Ring Co. Ltd., Tokyo, Japan

[22] Filed: Dec. 28, 1973

[21] Appl. No.: 429,440

[30] Foreign Application Priority Data
Dec. 28, 1972  Japan.................................. 47-2381

[52] U.S. Cl. ............... 192/85 R, 192/88 B, 277/73, 137/522
[51] Int. Cl. ........................ F16d 25/00, F16d 25/04
[58] Field of Search ........... 192/85 R, 85 A, 85 AA, 192/85 AT, 88 A, 88 B

[56] References Cited
UNITED STATES PATENTS
| | | | |
|---|---|---|---|
| 2,242,184 | 5/1941 | Reuter............................. | 192/88 B |
| 2,512,360 | 6/1950 | Mclean ........................... | 192/88 A |
| 3,598,147 | 8/1971 | Kosaka ............................. | 137/580 |

*Primary Examiner*—Benjamin W. Wyche
*Attorney, Agent, or Firm*—Sughrue, Rothwell, Mion, Zinn & Macpeak

[57] ABSTRACT

A fluid actuated clutch is mounted on a rotating driving shaft of a prime mover, to selectively transmit rotation to a driven shaft. The clutch comprises a rotary structure of substantially annular shape rigidly mounted on the driving shaft, a stationary structure of substantially annular shape supported by a pillow block of the clutch and located independently of the rotary structure while leaving a space therebetween. A fluid actuated sealing piston having a fluid passage and mounted in the stationary structure selectively effects a seal between the rotary and stationary structures, and supplies and discharges fluid under pressure into and from, respectively, an inflatable friction member. Once the seal is effected, the fluid is directed within the rotary structure through the fluid supplying means to activate the friction device and transmit rotative motion to the driven body. A normally closed check valve in the clutch may be opened by remote control means to release fluid pressure from the clutch. A pressure sensing device controls fluid supply to the clutch after pressure therein has reached a predetermined level.

5 Claims, 7 Drawing Figures

FLUID ACTUATED CLUTCH ASSEMBLY

BACKGROUND OF THE INVENTION

1. Field of the Invention

The present invention relates to a clutch assembly actuated by fluid under pressure, such as air, mounted on a rotating body, such as driving shaft of a prime mover, to selectively transmit rotative motion to the driven body, such as a shaft.

2. Description of the Prior Art:

In order to operationally transmit a driving force from a driving shaft of a prime mover to a driven shaft of machine, an air actuated clutch is often interposed between the two shafts. For this purpose, one of the shafts is required to have an air passage and a free end so that the air supply may be connected to the air passage. This results in a restriction on the use of such devices due to the necessity of a free end and the high cost generated by the complexity of fabricating a long shaft with a longitudinal passage therethrough.

Several attempts have been made to construct a clutch which obviates the above difficulties, as exemplified by U.S. Pat. No. 3,598,147. However, these apparatus are large and relatively complicated. As a result, they are required to have both ends supported by means of pillow blocks due to their weight and to the resultant problem of the so-called "overhang". They are also incapable of use in a restricted space due to their large size. This is predominant in a ship construction, which has a limited space between a marine engine and a screw propeller.

SUMMARY OF THE INVENTION

It is, therefore, an object of the present invention to provide an assembly for operationally actuating an air clutch obviating the above drawbacks.

Another object of the present invention is to provide an assembly of the above type, which is disposed around a rotating body so as not to add its own axial length to that of the total system including the rotating body, so that the overhang problem at its supports, such as bearings, can be minimized.

According to a primary aspect of the present invention, an assembly for supplying a working fluid, such as air under pressure, via a fluid conduit to air clutch which is mounted on a rotating body together with fluid supplying means, comprises a rotary structure of substantially annular shape rigidly secured to a driving shaft to rotate therewith. Said rotary structure has a radially extending flange part and a boss part, said boss part being provided with radially outer and inner annular recesses extending from one end face to the inside thereof in the axial direction of said driving shaft. A stationary structure of substantially annular shape, supported by a pillow block of said assembly, is located independently of said rotary structure while leaving a space therebetween for allowing relative rotation of said rotary structure. Said stationary structure is provided with radially outer and inner annular grooves extending from its one end face opposite to said one end face of said rotary structure to the inside thereof, in the axial direction. An inflatable friction member is fixedly attached to said flange part of said rotary structure. An annular sliding member or sealing ring is fixed within a radially outer annular recess of said rotary structure. Said sliding member is provided with an axial fluid passage. A communication passage is formed in said rotary structure, having one end open into said fluid passage of said sliding member and the other end connected to a fluid conduit communicating said inflatable friction member with said passage. A one-way valve device is provided in said communication passage, said one-way valve device having a valve member slidably provided therein and biased into its first, closed position for preventing counterflow of a working fluid in said communication passage from said inflatable friction member by the elastic force owing to a spring. An actuating piston is mounted in said radially inner annular recess of said rotary structure substantially in alignment with said oneway valve device, said poston device having a cylinder and a piston. Said piston is slidable within said cylinder in said axial direction and biased away from said one-way valve device by said valve member normally protruding its outer end opposite to said valve device into said space; between said rotary and stationary structures. A substantially annular sealing piston is slidably and hermetically inserted into said radially outer annular groove of said stationary structure. Said sealing piston has a plurality of axial fluid passages and an annular sliding element mounted within the outer side end face thereof. Said sliding element is provided with a plurality of axial fluid passages substantially in alignment with those of said sealing piston, respectively, and has an annular fluid accumulative groove at the outer end face thereof. A substantially annular discharging piston is slidably and hermetically carried by said radially inner annular groove of said stationary structure. Means selectively supply working fluid under pressure to said inflatalbe friction member, via said sealing piston, said communication passage and said fluid conduit, and to said discharging piston as a back pressure in accordance with a predetermined sequence, wherein said sealing piston is biased away from the inner side wall of said radially outer annular groove, when fluid pressure is applied thereto, for bringing said sliding base thereof into sealing contact with said sliding member mounted within said rotary structure so that the working fluid under pressure is supplied to said inflatable friction member. Said discharging piston is biased away from the inner side wall of said radially inner annular groove, when it is subject to fluid pressure slightly higher than that necessary to overcome the elastic force of said spring, for bringing the other end face thereof into abutting engagement with the extending end of said actuating piston, consequently moving said actuating piston and said valve member into its second open position so that said communication passage is opened.

DESCRIPTION OF THE PREFERRED EMBODIMENTS

Figure 1:
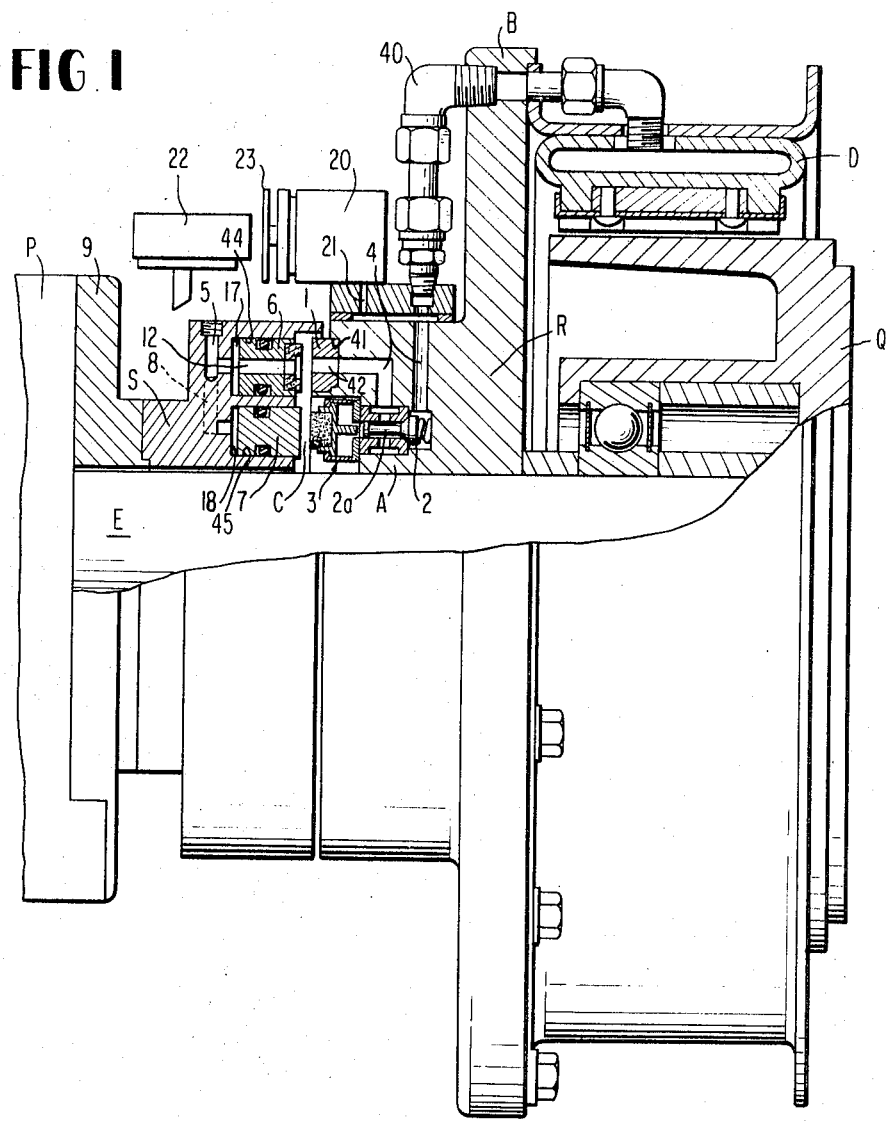
FIG. 1 is a partial vertical sectional view of a fluid actuated clutch assembly according to the present invention.

Referring now to FIG. 1, an air supply apparatus according to the present invention is mounted on a rotating body, such as a driving shaft E of a prime mover with an air clutch, which requires air under pressure when in operation. The air supplying apparatus generally comprises a rotary structure R and a stationary structure S. The rotary structure R, of substantially annular shape, has a boss part A, which is provided with radially outer and inner annular recesses, which are formed on one longitudinal end face thereof and extend inside thereof along the longitudinal direction thereof, and a radially extending flange part and is rigidly secured to the driving shaft E, for rotation therewith, for example, by means of a key (not shown) engaging the shaft E and the boss part A. The stationary structure S, of substantially annular shape, is supported by a pillow block P and located adjacent the rotary structure R, independently from the driving shaft E and the rotary structure R, while leaving a space C therebetween for allowing relative rotation of said rotary structure. The stationary structure S is connected to a source of air under pressure through air conduits via an air supply system, which will be described later in detail, and has radially outer and inner annular grooves, which are formed on the longitudinal end face thereof opposite to the rotary structure S and extend to the inside thereof along the longitudinal direction thereof.

An inflatable friction member D, providing the clutch operation to transmit rotative motion from the driving shaft E to a driven body, such as at Q, when air under pressure is supplied therein is fixedly attached the flange part A of the rotary structure R.

A slidingly annular sealing member or ring 1 is fixedly inserted into the radially outer annular recess 41 of the rotary structure R and has a plurality of axial fluid passages 42 therein. The rotary structure R is further provided with a plurality of communication passages 4, each one open into the respective fluid passages 42 of the sealing member 1 and the other end being connected to air conduit 40 communicating the inflatable friction member D with the passages 4. A plurality of one-way valve devices 2 are provided in respective communication passages 4, having a check valve member 2a which is slidably provided therein and is biased into its first, closed position, for preventing counterflow of the pressurized air in the respective communication passages 4 during the clutch operation of the inflatable friction member D, by an elastic force by means of a spring 2b. A plurality of actuating piston devices 3, each mounted in the radial inner annular recess 43 of the rotary structure R, substantially in alignment with the respective one-way valve devices 2 for moving the valve member 2a of each one-way valve device upon the air-discharging operation of the inflatable friction member D. In the stationary structure S, there is provided an annular sealing piston 6, which is slidably and hermetically inserted into the radially outer annular groove 44 formed in the stationary structure S, and an annular discharging piston 7, which is slidably and hermetically inserted into the radially inner annular groove 45 of the stationary structure S. A plurality of air supply passages 5 and 8 have their respective outside ends connected to air conduits communicating with a source of pressurized air. Between the inner end face of the sealing piston 6 and the inner wall of the groove 44 and between the inner end face of the discharging piston 7 and the inner wall of groove 45, air chambers 17 and 18 are formed, respectively. Further, within the inner wall of both grooves, respective short axial passages are provided so as to communicate the air supplying passages 5 with the air chamber 17 and to communicate the air supplying passages 8 with the air chamber 18, respectively. The outer end of the sealing piston 6 and of each actuating piston 3 may preferably be made of a sintered carbon impregnated with a synthetic resin. The desired material, for example, is a sintered carbon having a heat resistivity higher than 200°C and Shore hardness larger than 80) which is impregnated with a synthetic resin such as a silicone resin or a ethylene tetrafluoride resin.

Figure 2:
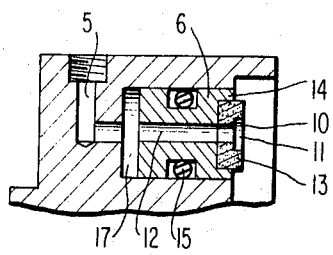
FIG. 2 is a partial enlarged vertical section showing a substantially annular sealing piston.

As seen from FIG. 2, the sealing piston 6 has a plurality of axial fluid passages or holes 12 and an annular sealingly sliding element 13 mounted in the outer side end face thereof. A holder 14 holds the sliding element 13 and an O-ring 15 which is disposed around said sealing piston 6 ensures sealed sliding of the piston 6. The annular sliding element 13 has a plurality of axial fluid passages or holes, each being in substantial alignment with the respective fluid passages or holes 12 formed in the sealing piston 6 so as to communicate with each other and element 13 has an annular groove 10 as forming a fluid accumulative chamber or manifold 11. The inner end of the fluid passages or holes 12 formed in the sealing piston 6 and the outer end of the fluid passages or holes of the sliding elements 13 are respectively open to the chamber 17 and the groove 10.

Figure 3:
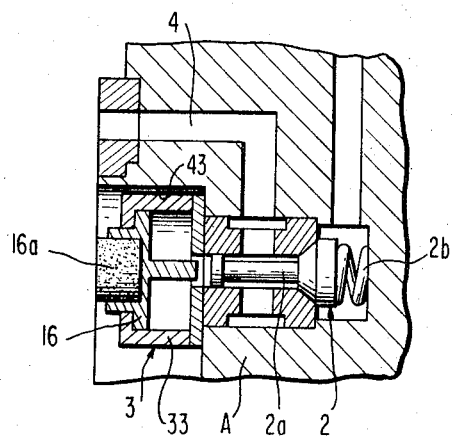
FIG. 3 is a partial enlarged vertical section showing a one-way valve device and an actuating piston device.

Furning now to FIG. 3, each actuating piston device 3 of substantially cylindrical shape and has a cylinder 33 and a piston 16, which has substantially T-shape in its section, and which is slidable within the cylinder in the longitudinal direction thereof and is biased away from the one-way valve device 2 by the valve stem 2a for extending its outer end thereof into the space C so that the outer extending end of the piston 16 is in abutting engagiment with the outer end face of the discharging piston 7 when the rear of discharging piston 7 receives air pressure from the air source through the air supply passage 8. For this purpose, the pistons 7 and 3 and the one-way valve 2 are disposed in axial alignment with each other. The actuating piston 3 may have its relative clyindrical sliding element 16a made of a sinterred carbon at its outer extending end which protrudes into the space C and brings the members into contact only when depressurization is desired to eliminate the seal wear problems of the prior art. The sliding element 16a may prefarably be chamferred or shaped to have a barrel-like countour.

The air supply passages 5 and 8 extend radially in the stationaly structure S.

Reverting to FIG. 1, the sliding member or sealing ring 1 sealingly contacts with the sliding element 13 of the sealing piston 6, upon movement of the sealing piston 6 in the longitudinal direction thereof when it is subjected to a air pressure via the air supply passage 5. This forms a plurality of closed air supply passages extending between the stationary and rotary structures while allowing relative rotation of the rotary structure R. Each sealing member 1 is made essentially of steel with its sealing surface finished by polishing or lapping after having been subjected to a hardening treatment, such as a quenching process. At the same time, the sealing piston 6 may preferably be made of an iron or copper alloy which has its sealing surface treated in the similar manner to that of the sealing member 1 to obtain a sufficient sealing characteristic. The air supply passage 5 is formed by boring radially the stationary structure S and has pipe threads at its radially outer end for connection thereat with an outside air conduit (not shown).

Now, the operation of thus constructed apparatus according to the present invention is explained below.

When it is desired, to supply pressurized fluid to the inflatable friction member D, pressurized air is at first introduced into chamber 17 to the rear of sealing piston 6 from the pressurized air source (not shown) through the air passages 5. The sealing piston 6 is actuated by the fluid pressure such that the sealingly sliding element 13 come into contact with the corresponding sealing ring or sliding member 1 mounted in the radially outer annular recess of the rotary structure R, thus forming the closed air passages extending between the two structure S and R and communicating with interposition of the one-way valves 2, respectively, the pressurized air source with the inflatable friction member D while allowing relative rotation of the rotary structure R. When the pressure in the inflatable friction member D reaches a predetermined level, the flow of the pressurized air is stopped. As a result, the sealing piston 6 moves back to its first position away from ring 1, at the same time, the flow in the air passages 4 on the upstream side from the one-way valves progressively drops, thus bringing the one-way valves 2 into the fully closed position. Therefore, the pressurized air existing in the inflatable friction member D and in the air passages from the one-way valves 2 to the inflatable friction member D is confined.

On the other hand, when it is intended to discharge or release the confined air from inflatable friction member D, pressurized air of relatively low pressure which has a force slightly greater than the elastic force of the spring 2b is introduced into the chamber 18 at the rear of piston 7, through the air passages 8. Thus, the piston 7 is moved to the right, in FIG. 1, into abutting engagement with the respective sliding elements 16a attached at the respective outer extending ends of the pistons 16 of the actuating piston devices 3. Subsequently, the valve members 2a of the one-way valve devices are biased into their second, open, positions, respectively, by the movement of the pistons 16 so as to terminate the sealing function thereof. As a result, the confined air in the inflatable friction member D is discharged to the outside thereof, since passage 4 is open to the atmosphere at space C.

Figure 4:
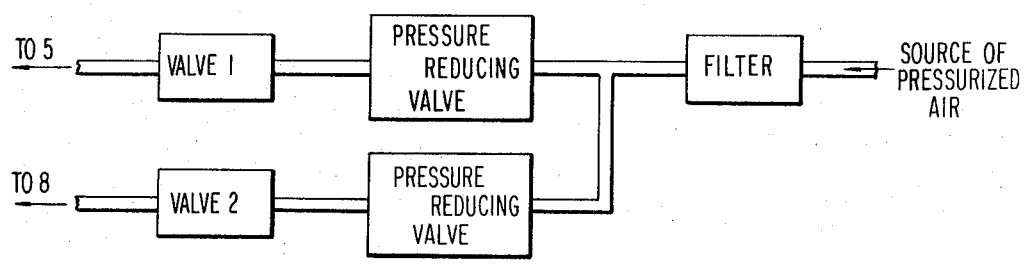
FIG. 4 is a diagrammatical view showing a working fluid supply system for the clutch assambly of FIG. 1.

Furning now to FIG. 4, the air supply system in the present invention is provided for selectively supplying air under pressure to the sealing piston 6 and to the discharging piston 7 via the two air supply passages 5 and 8, respectively, in accordance with a predetermined sequence, which comprises two solenoid valves, valve 1 and valve 2, which are connected at the outlet side with the air supply passages 5 and 8, respectively, as shown in the FIG. 4. These solenoid valves have their inlet side connected to a source of pressurized air via an air filter and via two pressure reducing valves, respectively. The operation of this system, that is, the manner in which the working fluid or the pressurized air is supplied to the passages 5 and 8 is believed apparent to those skilled in the art and its description will be omitted here.

The control of the solenoid valves is accomplished by a working pressure detecting device which will be described with reference to FIGS. 1 and 7. The control system comprises a pressure detecting device 20 which is mounted on the outer periphery of the rotary structure R for detecting a level of the pressure exerted on the inflatable friction member D. This detecting device 20 is composed of a bellows 201, a movable element including a disc 202 and a plunger 203, and a spring 204, all of which are accommodated in a cylindrical chamber 205 having communication with the inflatable friction member D via conduit 21. An actuating device includingg a contactless switch 22 is mounted on the stationary structure S at a position facing the detecting device 20. Since the disc 202 of the movable element is cyclically rotated relative to the contactless switch 22, the actuating device further includes a delay device (not shown), through which the switch 22 is connected with the solenoid of the solenoid valve, valve 2.

Figure 7:
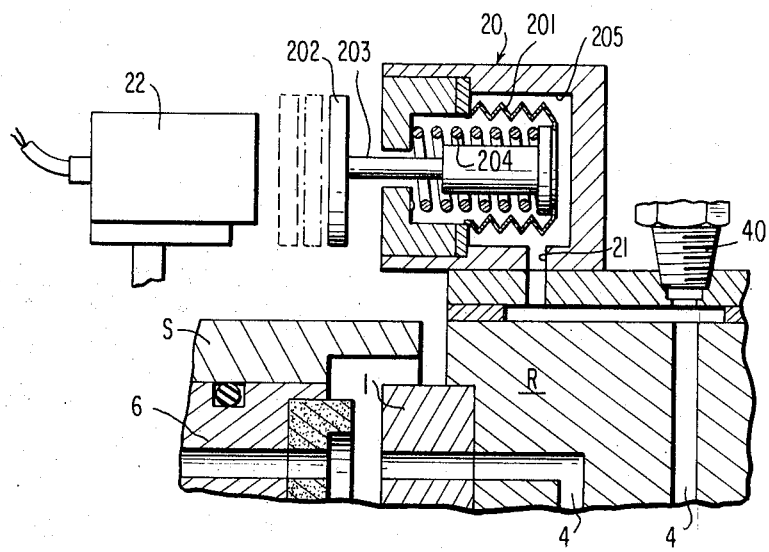
FIG. 7 is an enlarged, sectional view of a portion of the apparatus of FIG. 1.

When inflatable friction member D is occupied with air of a pressure higher than a predetermined level, the air having passed through the air conduit 21 will compress the bellows 201, so that the plunger 203 is moved leftwardly, as shown in FIG. 7 to have the disc 202 located at the position as shown by broken lines. when, in this instance, the pressure in the expandible member D is reduced for some reason to the predetermined level, then the disc 202 is shifted by the biasing action of the spring 204 to such a position as shown by solid lines. At this instant, the contactless switch 22 detects this shift to produce an electric signal. This signal is supplied to the solenoid of the solenoid valve 1 to terminate the fluid flow through passages 5. Valve 2 is manually controllable by way of a push button, for instance (not shown), and is actuated when deflation of the inflatable friction member D desired.

The advantages obtainable from the present invention over the prior art are as follows:

(1) the stationary structure S is disposed around the boss portion 1 of the rotating body R so that the axial length of the clutch assembly can be reduced to almost half of that of the previous structures, and (2) the discharging piston 7 is made of an annular metal member, and the actuating piston 3 has at its extending end a cylindrical sealing element 16a made of a sintered carbon. Item (1) means that the total length of the air supply apparatus can be minimized, and the construction of item (2) can solve the problem of wearing of the sealing element, which has been one of the most serious problems in the prior art. As to the latter advantage, more specifically, the conventional arrangement is to provide continuous sealed fluid connection between the annular surface of the discharging piston 7 and a flat surface of the actuating piston 3. This sliding contact is of continuous nature, thus causing deterioration of the seal due to the friction heat developed. As a result, the carbon used as a material for the contact surfaces will be worn in an undesirable manner. It should be emphasized here that the working fluid to be used in the present air supply system need not be limited to air.

The sealing piston device 6 shown in FIG. 2 is one embodiment thereof according to the present invention wherein a common air chamber is used in the supply of pressurized air for supplying the working air and for actuating the sealing piston 6. However, it is not limited to the sealing piston device 6 as shown in FIG. 2 in the present invention.

Figure 5:
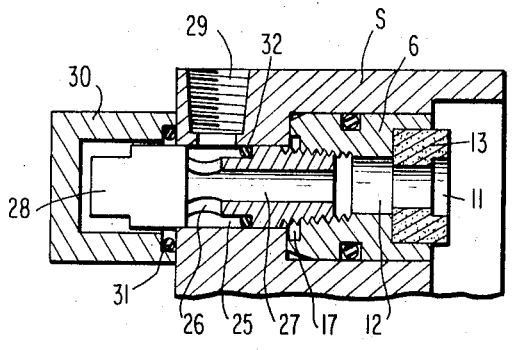
FIGS. 5 and 6 are partial enlarged vertical sections showing another embodiment of the sealing piston.
Figure 6:
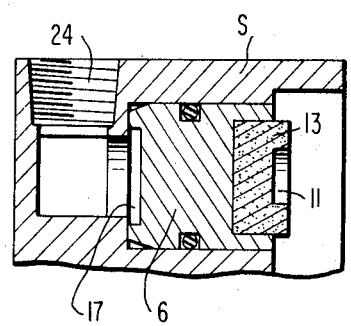

Another embodiment of the sealing piston device 6 in the present invention is shown in FIGS. 5 and 6. According to this second embodiment, the pressurized air for use to expand the inflatable friction member D and that for use to actuate the sealing piston 6 are separately supplied with the different air passages from each other, that is, the pressurized air for use to expand the inflatable friction member D is supplied into respective air passage holes of the sealing piston 6 with another group of air passages independent from the air chamber 17 in the sealing piston 6, vice versa.

As seen from FIGS. 5 and 6, a plurality of air supplying passages 24 is provided at the back of the sealing piston 6 so as to communicate with a back chamber 17 formed between the sealing piston 6 and the inner wall face of the sealing piston groove. On the other hand, in each air supplying passage 12, a spool 28 is hermetically inserted by, for example, means of screwing. The spool 28 has an outer annular groove 25 formed around the outer periphery thereof, a transverse spool hole 26, which communicates with the groove 25, and a longitudinal spool hole 27, along a partial length, which communicates with the transverse spool hole 26. There is so provided in the stationary structure S a plurality of pressurized air supplying passages 29 as to communicate with the groove 25 of the spool 28. These passages 29 are formed to extend radially from the passages 24 in the stationary structure S by boring radially, the stationary structure S, and has pipe threads at its radially outer end for connection thereat with an outside air conduit (not shown). Numeral 30 shows a cover for the spool (28) which is attached the stationary structure S by way of an O-ring 31. In order to seal the groove 25, an O-ring 32 is provided therein.

In place of connecting the spools 28 in the passages 12, it is possible to bore a plurality of holes extending along the axial direction and communicating with the passages 12, respectively, at the side end face of the stationary structure S and to insert air conduits into the holes.

In these embodiments, with the supply of pressurized air to the passages 12 through such air passages 29 independent from chamber 17, three solenoid valves, i.e., one is used upon sealing the air passages between two structures S and R and others are used upon supplying the working air and upon discharging the air, respectively, may be preferably used. It is preferably desired that the air pressure at 24 for use in sealing is 4 kg/cm$^2$, which is lower than that of the working air. The pressure of the working air is preferably 8 kg/cm$^2$.

Further, it is necessary that the passages 12 are is provided in such a manner that the holes at equal circumferential distances from each other for maintaining balance. This is the for the one-way valves and the discharging valves.

What is claimed is:

1. A fluid actuated clutch assembly comprising:
    a. a rotary structure of substantially annular shape rigidly secured to a shaft for rotation therewith, said rotary structure having a radially extneding flange part and a boss part, said boss part being provided with radially outer and inner annular recesses formed on one end face thereof,
    b. a stationary structure of substantially annular shape supported by a pillow block, axially facing said rotary structure, and located independently of said rotary structure to leave an axial space therebetween for allowing relative rotation of said rotary structure, said stationary structure being provided with radially outer and inner annular grooves formed on an end face thereof, opposite to said one end face of said rotary structure and opening in longitudinal direction thereof,
    c. an inflatable friction member fixedly attached said flange part of said rotary structure,
    d. a relative annular sealing ring fixedly inserted into said radially outer annular recess of said rotary structure, said sealing ring being provided with a plurality of axial fluid passages,
    e. a plurality of communication passages formed in said rotary structure, each one having one end open into a respective fluid passage of said sealing ring and the other end being fluid connected to said inflatable friction member,
    f. a plurality of one-way valve devices, each provided in a respective communication passage and having a valve member slidably provided therein and biased into its first, closed position for preventing counterflow of a working fluid under pressure in the respective communication passages from said inflatable friction member during the clutch operation of said inflatable friction member, by means of a spring,
    g. a plurality of actuating piston devices, each having a cylinder and a piston and mounted within said radially inner annular recess of said rotary structure, substantially in alignment with the respective one-way valve devices, said piston being slidable within said cylinder in an axial direction and biased away from said one-way valve device by said valve member with its outer end protruding into said space,
    h. a substantially annular sealing piston slidably and hermetically carried within said radially outer annular groove of said stationary structure in a manner to form a substantially annular fluid chamber, which communicates with a fluid source, between the inner end face thereof and the inner wall of said groove, said sealing piston having a plurality of axial fluid passages and having an annular sealingly, sliding element mounted within its outer end face thereof, said sliding element being provided with a plurality of axial fluid passages, each being substantially in alignment with the respective fluid passage of said sealing piston, said sliding element being provided with an annular fluid accumulative groove, which communicates circumferentially with all of said holes of said sliding element, at the outer side end face thereof,
    i. a substantially annular discharging piston slidably and hermetically carried by said radially inner annular groove of said stationary structure in a manner to form a substantially annular fluid chamber communicating with the fluid source, between the inner end face thereof and the inner wall of said groove, and
    j. means for selectively supplying the working fluid to said sealing and discharging pistons in accordance with a predetermined sequence; wherein said sealing piston is biased away from the inner side wall of said radially outer groove, upon application of a fluid pressure thereto for bringing said sliding element thereof into sealing contact with said sealing ring so that the working fluid is supplied to said inflatable friction member, and wherein said discharging piston is biased away from the inner side wall of said radially inner annular groove, upon application of a fluid pressure thereto, for bringing the outer end face thereof into abutting engagement with said protruding end of said actuating piston, consequently moving said piston and said valve member into its second, open position so that said communication passage is opened.

2. An assembly according to claim 1, wherein said sliding element mounted in the outer end face of said sealing piston and said outer, protruding end of said actuating piston are made of a sintered carbon impregnated with a synthetic resin.

3. An assembly according to claim 1, further comprising pressure detecting means mounted on said rotary structure for detecting the pressure level within said inflatable friction member, and means responsive to pressure detection for controlling flow of pressurized fluid to said inflatable friction member.

4. An assembly according to claim 3, wherein said controlling means comprises a proximity switch mounted on said stationary structure and a flow control valve operatively coupled to said proximity switch and said means for selectively supplying working fluid to said sealing piston, and wherein, said pressure detecting means comprises a longitudinally movable detecting element in juxtaposition to said proximity switch and movable toward and way from said stationary switch, the position of said detecting element varying with the pressure within the inflatable friction element, whereby: in response to movement of said detecting element, said switch and said valve means controls the supply of working fluid to said sealing piston.

5. An assembly according to claim 1, wherein said sealing piston comprises plural passages, separate from each other, one passage communicating said fluid chamber of said sealing piston with the fluid source for actuating said sealing piston upon application of a fluid pressure as a back pressure thereto, and the other passage communicating said fluid passages of said sliding element of said sealing piston with the fluid source for supplying the working fluid to said inflatable friction member.

* * * * *